United States Patent
Pandey et al.

(10) Patent No.: US 11,182,810 B1
(45) Date of Patent: Nov. 23, 2021

(54) METHOD, APPARATUS, AND COMPUTER PROGRAM PRODUCT FOR MERCHANT CLASSIFICATION

(71) Applicant: Groupon, Inc., Chicago, IL (US)

(72) Inventors: Addhyan Pandey, Chicago, IL (US); Waigen Zhang, Glenview, IL (US); Zahra Ferdowsi, Chicago, IL (US); Angela Han, Chicago, IL (US)

(73) Assignee: Groupon, Inc., Chicago, IL (US)

(*) Notice: Subject to any disclaimer, the term of this patent is extended or adjusted under 35 U.S.C. 154(b) by 1418 days.

(21) Appl. No.: 15/192,366

(22) Filed: Jun. 24, 2016

Related U.S. Application Data

(60) Provisional application No. 62/185,101, filed on Jun. 26, 2015.

(51) Int. Cl.
*G06Q 30/02* (2012.01)
*G06Q 10/06* (2012.01)

(52) U.S. Cl.
CPC ..... *G06Q 30/0204* (2013.01); *G06Q 10/0635* (2013.01); *G06Q 30/0202* (2013.01); *G06Q 30/0241* (2013.01); *G06Q 30/0211* (2013.01); *G06Q 30/0242* (2013.01)

(58) Field of Classification Search
None
See application file for complete search history.

(56) References Cited

U.S. PATENT DOCUMENTS

| | | | | |
|---|---|---|---|---|
| 8,429,067 | B1* | 4/2013 | Keller | G06Q 40/025 705/38 |
| 8,583,513 | B1* | 11/2013 | Talreja | G06Q 30/08 705/27.1 |
| 8,935,247 | B1* | 1/2015 | Tholome | G06F 16/355 707/736 |
| 9,679,261 | B1* | 6/2017 | Hoover | G06F 16/212 |
| 2004/0073520 | A1* | 4/2004 | Eskandari | G06Q 30/02 705/400 |
| 2005/0234761 | A1* | 10/2005 | Pinto | G06Q 10/063 705/7.28 |
| 2006/0212350 | A1* | 9/2006 | Ellis | G06Q 30/0254 705/14.41 |
| 2006/0235747 | A1* | 10/2006 | Hammond | G06Q 10/10 705/14.24 |

(Continued)

OTHER PUBLICATIONS

Xu, Ruo, "Improvements to random forest methodology". Graduate Theses and Dissertations. 13052. https://lib.dr.iastate.edu/etd/13052 (Year: 2013).*

(Continued)

*Primary Examiner* — Shelby A Turner
(74) *Attorney, Agent, or Firm* — Alston & Bird LLP

(57) ABSTRACT

Embodiments of the present invention provide methods, systems, apparatuses, and computer program products for classifying merchants. In one embodiment a method is provided comprising determining, based on a first value, a first prediction value that indicates a programmatically expected number of consumers that will request termination of an accepted first promotion; and determining, based on the first prediction value, a classification for the first entity, the classification specifying a likelihood that the transmittal of the first promotion to consumers will result in a number of terminations less than a pre-specified threshold.

14 Claims, 12 Drawing Sheets

(56) References Cited

U.S. PATENT DOCUMENTS

| | | | | |
|---|---|---|---|---|
| 2007/0112840 | A1* | 5/2007 | Carson | G06Q 30/02 |
| 2007/0156673 | A1* | 7/2007 | Maga | G06Q 30/02 |
| 2008/0033784 | A1* | 2/2008 | Chalimadugu | H04L 67/02 |
| | | | | 705/7.29 |
| 2008/0270209 | A1* | 10/2008 | Mauseth | G06Q 10/10 |
| | | | | 705/7.29 |
| 2009/0177540 | A1* | 7/2009 | Quatse | G06Q 30/02 |
| | | | | 705/14.26 |
| 2009/0271275 | A1* | 10/2009 | Regmi | G06Q 30/0217 |
| | | | | 705/14.73 |
| 2009/0276309 | A1* | 11/2009 | Otto | G06Q 30/0264 |
| | | | | 705/14.25 |
| 2012/0158456 | A1* | 6/2012 | Wang | G06Q 30/0202 |
| | | | | 705/7.31 |
| 2012/0310729 | A1* | 12/2012 | Dalto | G06Q 30/02 |
| | | | | 705/14.43 |
| 2013/0006916 | A1* | 1/2013 | McBride | G06Q 30/0629 |
| | | | | 706/52 |
| 2013/0325587 | A1* | 12/2013 | Kothari | G06Q 30/0201 |
| | | | | 705/14.42 |
| 2014/0114741 | A1* | 4/2014 | Genc-Kaya | G06Q 30/0247 |
| | | | | 705/14.41 |
| 2014/0180790 | A1* | 6/2014 | Boal | G06Q 30/0251 |
| | | | | 705/14.42 |
| 2015/0287059 | A1* | 10/2015 | Ouyang | G06Q 10/06393 |
| | | | | 705/7.31 |
| 2016/0086222 | A1* | 3/2016 | Kurapati | G06Q 30/0261 |
| | | | | 705/14.53 |
| 2016/0148226 | A1* | 5/2016 | Popescu | G06Q 30/0202 |
| | | | | 705/7.31 |
| 2016/0180256 | A1* | 6/2016 | Renaud | G06Q 30/0202 |
| | | | | 705/5 |
| 2016/0253688 | A1* | 9/2016 | Nielsen | G06F 16/337 |
| | | | | 705/7.31 |
| 2016/0321683 | A1* | 11/2016 | Chen | G06Q 30/0208 |
| 2017/0228777 | A1* | 8/2017 | Fischer | G06Q 30/0206 |
| 2018/0137526 | A1* | 5/2018 | Haruta | G06F 16/2465 |

OTHER PUBLICATIONS

Zhang H, Wang M. Search for the smallest random forest. Stat Interface. 2(3):381. doi:10.4310/sii.2009.v2.n3.a11 (Year: 2009).*

Robnik-Šikonja M. Improving Random Forests. In: Boulicaut JF., Esposito F., Giannotti F., Pedreschi D. (eds) Machine Learning: ECML 2004. ECML 2004. Lecture Notes in Computer Science, vol. 3201. Springer, Berlin, Heidelberg (Year: 2004).*

Louppe, Gilles. Understanding Random Forests: From Theory to Practice. 10.13140/2.1.1570.5928. https://www.researchgate.net/publication/264312332 (Year: 2014).*

L. Yan, R. Wolniewicz and R. Dodier, "Customer behavior prediction—it's all in the timing," in IEEE Potentials, vol. 23, No. 4, pp. 20-25, Oct.-Nov. 2004, doi: 10.1109/MP.2004.1343225 (Year: 2004).*

* cited by examiner

| Top 10 (highest refund rate) | | | Bottom 10 (lowest refund rate) | | |
|---|---|---|---|---|---|
| division | avg. RFR | # of camp. | division | avg. RFR | # of camp. |
| macon | 27.75% | 7 | winnipeg | 3.86% | 21 |
| baton-rouge | 18.42% | 38 | appleton | 3.51% | 14 |
| miami | 18.17% | 329 | montgomery | 3.48% | 3 |
| palm-beach | 18.08% | 154 | columbus-ga | 3.14% | 8 |
| chattanooga | 16.84% | 30 | lincoln | 3.00% | 14 |
| jackson | 16.45% | 22 | kingston | 2.36% | 9 |
| savannah-hilton-head | 16.44% | 28 | billings | 2.04% | 3 |
| houston | 16.39% | 394 | st-johns | 2.01% | 7 |
| little-rock | 16.32% | 19 | sudbury | 1.29% | 1 |
| modesto | 16.13% | 31 | midland-odessa | 1.02% | 2 |

FIG. 10A

| division | # of camp. | avg. RFR | division | # of camp. | avg. RFR |
|---|---|---|---|---|---|
| chicago | 725 | 11.19% | san-diego | 345 | 10.76% |
| los-angeles | 601 | 14.98% | boston | 335 | 10.68% |
| new-york | 573 | 14.89% | seattle | 333 | 9.32% |
| phoenix | 517 | 10.64% | miami | 329 | 18.17% |
| atlanta | 476 | 13.50% | denver | 328 | 8.24% |
| dallas | 456 | 12.39% | tampa-bay-area | 313 | 10.61% |
| san-francisco | 418 | 9.96% | orange-county | 309 | 12.16% |
| washington-dc | 394 | 13.96% | north-jersey | 299 | 11.91% |
| houston | 394 | 16.39% | fort-lauderdale | 293 | 13.73% |
| greater-toronto-area | 361 | 12.08% | detroit | 293 | 9.74% |

FIG. 10B

| Top 10 (highest refund rate) | | | Bottom 10 (lowest refund rate) | | |
|---|---|---|---|---|---|
| service | # of camp. | avg. RFR | service | # of camp. | avg. RFR |
| Black Car / Limo / Chauffeur | 38 | 40.39% | Gastropub | 46 | 3.83% |
| Dental Implant / Corona / Veneer | 12 | 37.57% | Trampoline | 29 | 3.79% |
| Extensions / Feathering | 30 | 34.70% | Frozen Yogurt | 79 | 3.67% |
| Braces - Invisible - Branded (Invisalign) | 25 | 33.58% | Framing | 16 | 3.59% |
| Moving | 35 | 32.85% | Golf - Mini Golf | 44 | 3.57% |
| Party - Children's | 12 | 32.80% | Chinese | 31 | 3.53% |
| Pet - Sitter / Walking | 26 | 32.42% | Corn Maze | 12 | 3.16% |
| Photobooth | 59 | 31.92% | Cinema / Movie Theater | 40 | 3.12% |
| Injection - Dermal Filler | 12 | 31.39% | Bistro | 11 | 3.06% |
| Liposuction - Invasive Laser - Smart Lipo | 10 | 30.56% | Baseball - Training | 10 | 2.25% |

FIG. 11A

| Top 10 (highest refund rate) | | | Bottom 10 (lowest refund rate) | | |
|---|---|---|---|---|---|
| service | # of camp. | avg. RFR | service | # of camp. | avg. RFR |
| Photobooth | 59 | 31.92% | Sushi | 112 | 5.64% |
| House / Room | 146 | 26.68% | Mexican | 168 | 5.50% |
| Mobile Phone / Smartphone Repair | 55 | 22.75% | Tasting - Wine | 92 | 5.47% |
| Carpet / Rug | 134 | 21.18% | Museum | 148 | 5.40% |
| Photo Shoot - Boudoir / Pin-up | 50 | 18.70% | American - Casual | 338 | 5.31% |
| Personalized Fitness Program | 65 | 18.30% | Pizza | 204 | 5.08% |
| Makeup - Permanent | 51 | 18.11% | Italian | 199 | 5.03% |
| Weight Loss Program | 61 | 17.18% | Golf - Recreational | 232 | 4.86% |
| HVAC Cleaning | 54 | 16.61% | Sandwiches | 88 | 4.10% |
| Exterior & Interior Detail | 102 | 16.50% | Frozen Yogurt | 79 | 3.67% |

FIG. 11B

| service | # of camp. | avg. RFR | service | # of camp. | avg. RFR |
|---|---|---|---|---|---|
| Haircut - Women | 443 | 12.43% | Laser Hair Removal | 215 | 14.25% |
| Massage - Full Body | 382 | 9.99% | CrossFit | 208 | 8.93% |
| Facial | 377 | 10.41% | Pizza | 204 | 5.08% |
| Color / Highlights | 355 | 13.29% | Boot Camp | 200 | 13.41% |
| American - Casual | 338 | 5.31% | Italian | 199 | 5.03% |
| Massage - Swedish | 328 | 11.65% | Facial - Microdermabrasion | 189 | 10.09% |
| Yoga | 276 | 8.21% | Dance Class | 188 | 9.86% |
| Fitness Studio | 246 | 9.62% | Photo Shoot - Outdoor | 176 | 12.00% |
| Golf - Recreational | 232 | 4.86% | Haircut | 173 | 14.43% |
| Massage - Deep Tissue | 226 | 11.56% | Eyelash Extensions | 172 | 16.10% |

FIG. 12

METHOD, APPARATUS, AND COMPUTER PROGRAM PRODUCT FOR MERCHANT CLASSIFICATION

CROSS REFERENCE TO RELATED APPLICATIONS

This application claims the benefit of U.S. Provisional Application No. 62/185,101, titled "Method, Apparatus, and Computer Program Product for Merchant Classification," filed Jun. 26, 2015, which is incorporated by reference herein in its entirety.

BACKGROUND

A promotional and marketing service may utilize the internet to provide consumers with available promotions related to products, services or experiences offered by providers that may be of interest. Applicant has identified a number of deficiencies and problems associated with assessing the risks of recommending particular merchants to consumers. Through applied effort, ingenuity, and innovation, many of these identified problems have been solved by developing solutions that are included in embodiments of the present invention, many examples of which are described in detail herein.

BRIEF SUMMARY

This specification relates to merchant classification based on a machine learning model.

In general, one innovative aspect of the subject matter described in this specification can be embodied in methods that include the actions of receiving data for a first entity, the first entity being an entity requesting transmittal of a first promotion to consumers, determining, for the first entity, a first value, the first value for the first entity being a value indicative of a maximum number of first promotions that the first entity is capable of satisfying, determining, based on the first value, a first prediction value that indicates a programmatically expected number of consumers that will request termination of an accepted first promotion, and determining, based on the first prediction value, a classification for the first entity, the classification specifying a likelihood that the transmittal of the first promotion to consumers will result in a number of terminations less than a pre-specified threshold.

Other embodiments of this aspect include corresponding systems, apparatus, and computer programs, configured to perform the actions of the methods, encoded on computer storage devices.

These and other embodiments can each optionally include one or more of the following features. Determining the first prediction based on a machine learned model. Determining the first prediction based on historical data associated with the first entity. Determining, for the first entity, a second value, the second value for the first entity being a value indicative of a number of promotions, similar to the first promotion, that are available to consumers at a pre-specified location, the pre-specified location being a location associated with the first promotion. Determining, for the first entity, a third value, the third value for the first entity being a value indicative of a programmatically expected number of consumers that will accept the first promotion within a pre-specified period of time from transmittal of the first promotion.

In general, another aspect of the subject matter described in this specification can be embodied in methods that include the actions of receiving data for a first entity, the first entity being an entity requesting transmittal of a first promotion to consumers, determining, for the first entity, a first value, the first value for the first entity being a value indicative of a number of promotions, similar to the first promotion, that are available to consumers at a pre-specified location, the pre-specified location being a location associated with the first promotion, determining, based on the first value, a first prediction value that indicates a programmatically expected number of consumers that will request termination of an accepted first promotion, and determining, based on the first prediction, a classification for the first entity, the classification specifying a likelihood that the transmittal of the first promotion to consumers will result in terminations less than a pre-specified threshold.

Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving data for a first entity, the first entity being an entity requesting transmittal of a first promotion to consumers, determining, for the first entity, a first value, the first value for the first entity being a value indicative of a programmatically expected number of consumers that will accept the first promotion within a pre-specified period of time from transmittal of the first promotion, determining, based on the first value, a first prediction value that indicates a programmatically expected number of consumers that will request termination of an accepted first promotion, and determining, based on the first prediction, a classification for the first entity, the classification specifying a likelihood that the transmittal of the first promotion to consumers will result in terminations less than a pre-specified threshold.

Other embodiments of this aspect include corresponding systems, apparatus, and computer programs, configured to perform the actions of the methods, encoded on computer storage devices.

In general, another aspect of the subject matter described in this specification can be embodied in methods that include the actions of selecting first attributes from an attribute pool to generate a first decision tree, the first decision tree being a model for classifying merchants, determining, for a first merchant, a first prediction based on the first decision tree and the first attributes, the first prediction being a predication classifying the first merchant, selecting second attributes from the attribute pool to generate a second decision tree, the second attributes being different from the first attributes and the second decision tree being a model for classifying merchants, determining, for a first merchant, a second prediction based on the second decision tree and the second attributes, the second prediction being a predication classifying the first merchant, classifying the first merchant based on the first and second predictions.

Other embodiments of this aspect include corresponding systems, apparatus, and computer programs, configured to perform the actions of the methods, encoded on computer storage devices.

These and other embodiments can each optionally include one or more of the following features. Selecting third attributes from an attribute pool to generate a third decision tree, the third decision tree being a model for classifying merchants. Determining, for a first merchant, a third prediction based on the third decision tree and the third attributes, the third prediction being a predication classifying the first merchant. Classifying the first merchant based on a mode of the first, second, and third classifications.

Particular embodiments of the subject matter described in this specification can be implemented so as to realize one or more of the following advantages. Reduce the number of terminated promotions and, in turn, improve the user experience. Reduce the cost associated with terminations and, in turn, increase the overall revenue. Reduce the required processing power for a server maintaining and provisioning the promotions. Reduce the manpower required communication with potential merchants. Similarly, reduction of the required processing power and manpower, in turn, increases the overall revenue. Further, particular embodiments of the subject matter allow for providing better insurance policies, and for processing a higher number of merchant requests. In turn, this increases the inventory capacity and allows for providing consumers with highly relevant promotions that are associated with lower risk.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
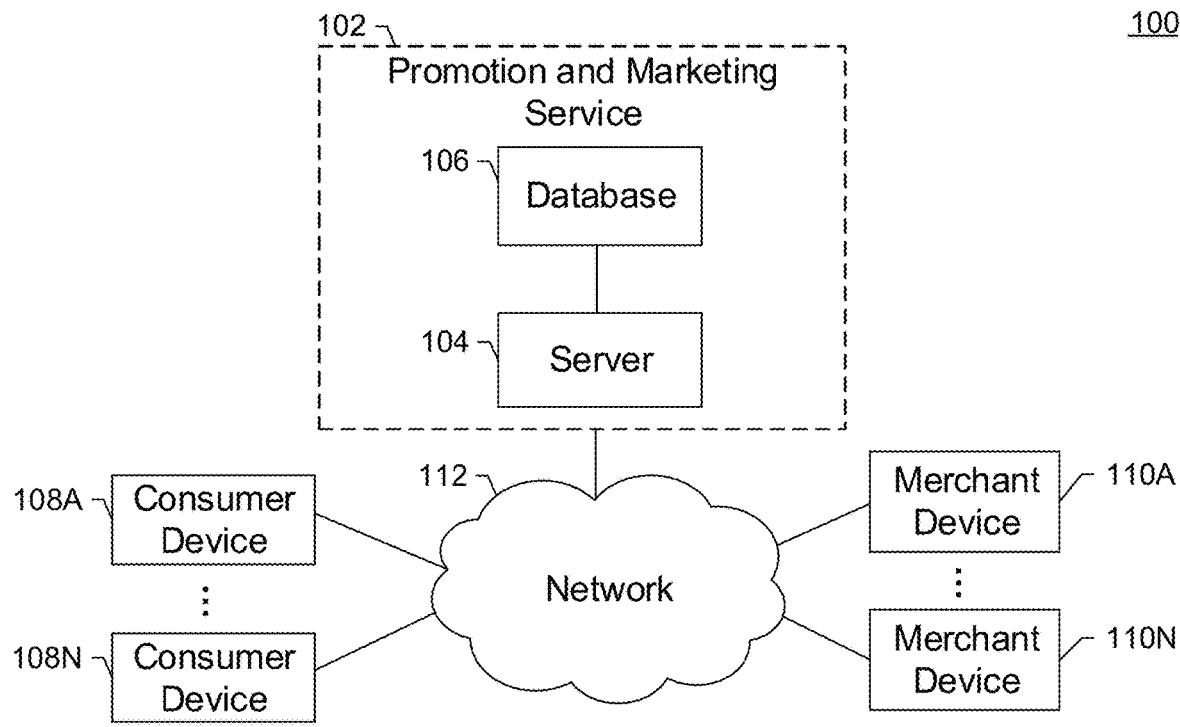
Figure 2:
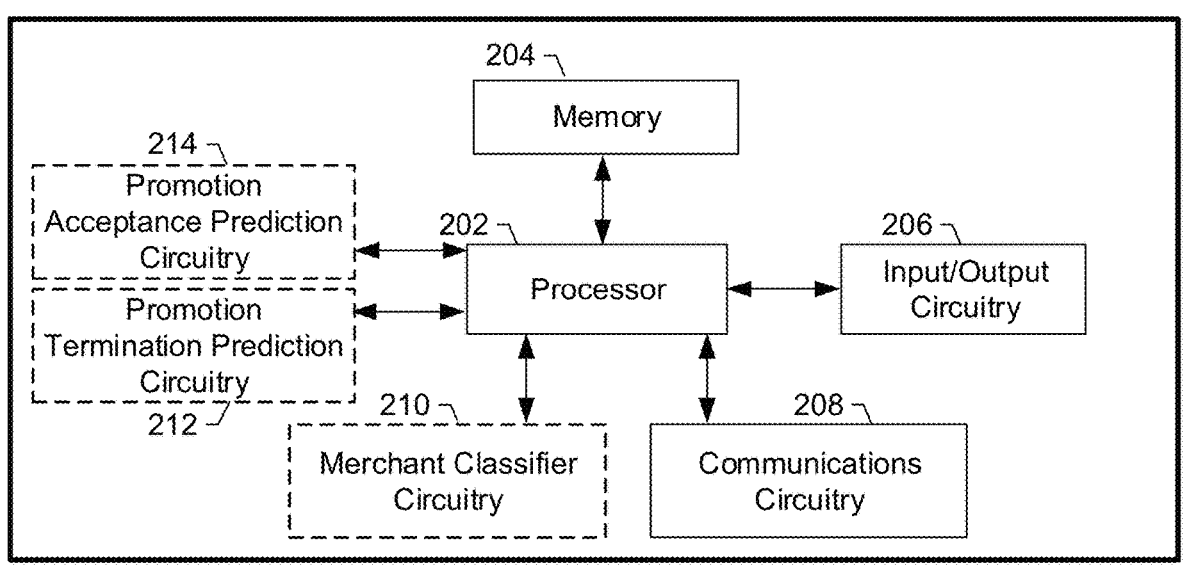
Figure 3:
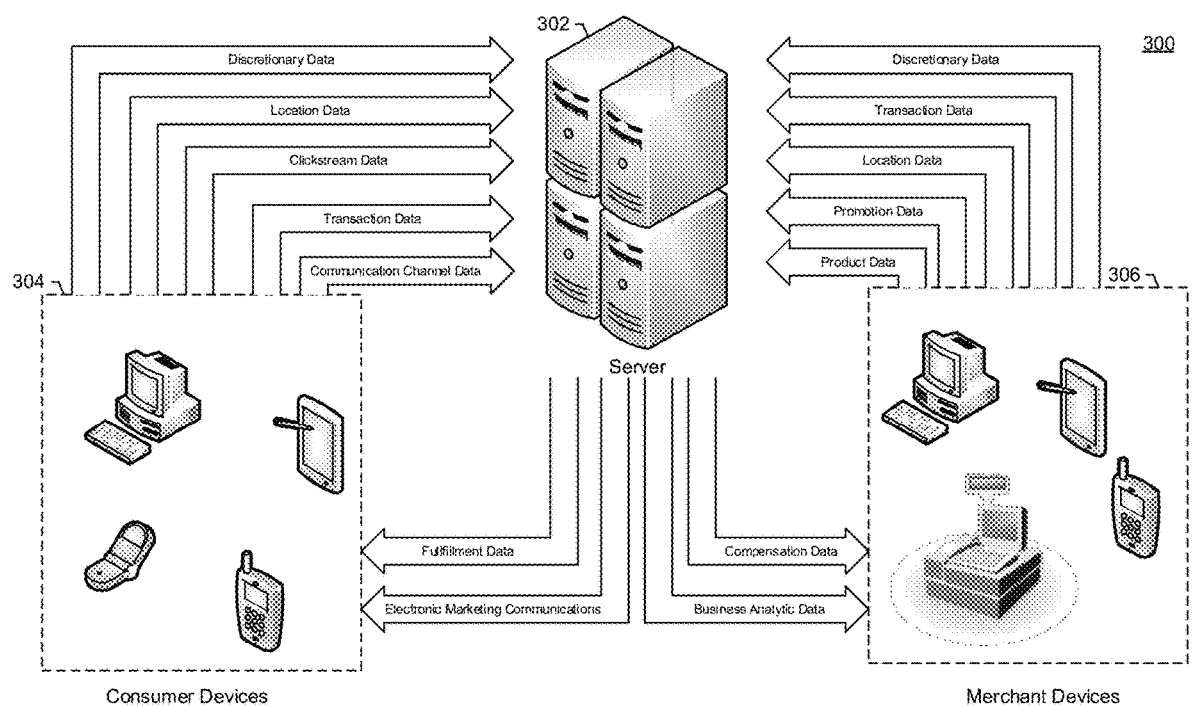
Figure 5:
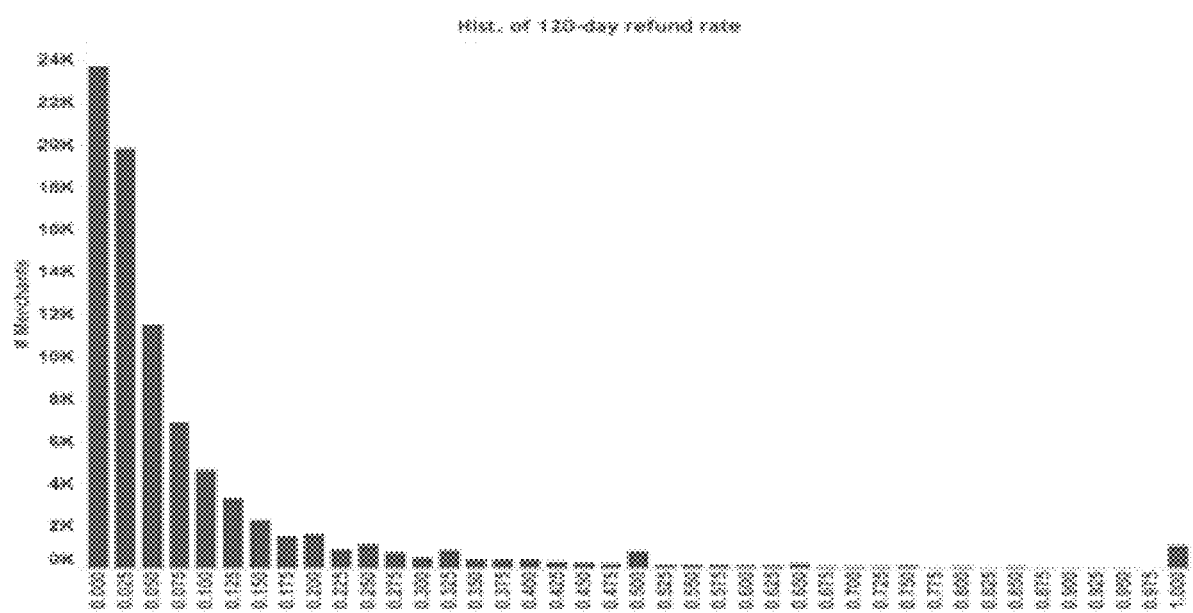
Figure 8:
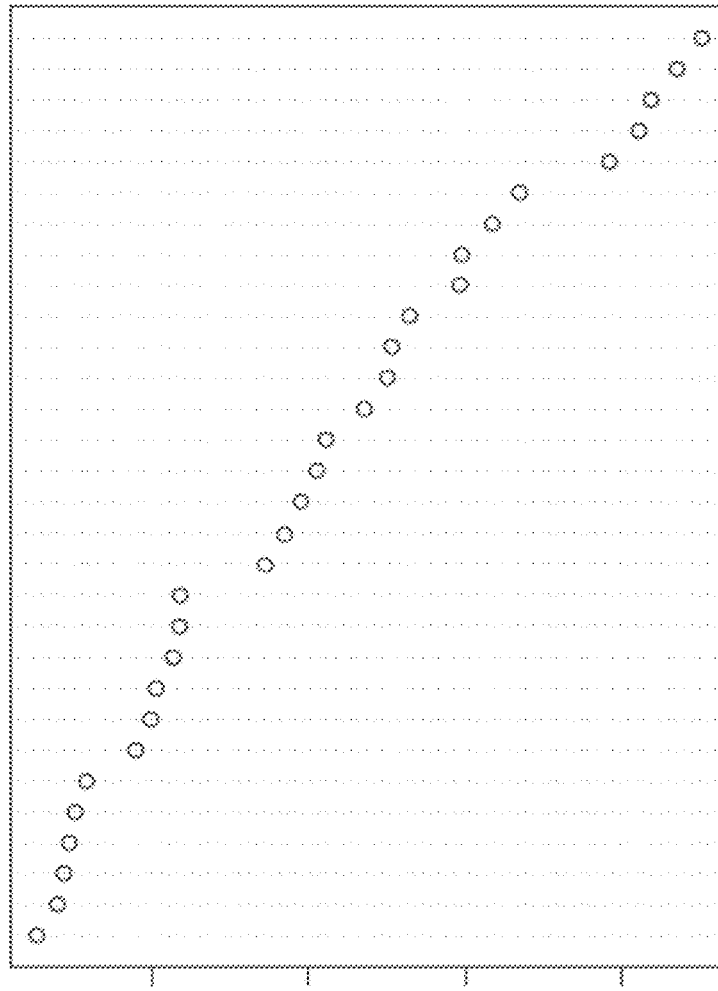

Having thus described the invention in general terms, reference will now be made to the accompanying drawings, which are not necessarily drawn to scale, and wherein:

FIG. 1 is an overview of an example system that can be used to practice embodiments of the present invention;

FIG. 2 is an exemplary schematic diagram of a computing entity according to one embodiment of the present invention;

FIG. 3 is an exemplary data flow illustrating interactions between a server, one or more consumer devices, and one or more merchant devices;

FIGS. 4, 6, 7, 9A, and 9B are flow charts illustrating various procedures and operations that may be completed in accordance with various embodiments of the present invention;

FIG. 5 depicts an example graphical representation of a statistical distribution for refund rates over a 120 day period;

FIG. 8 shows a list of example attributes, for classifying merchants, and an associated ranking indicating a measure of importance for each attribute;

FIGS. 10A and 10B depict past performances statistical data, during a test period, for highest and lowest rankings divisions among all and only large divisions respectively;

FIGS. 11A and 11B depict past performances statistical data, during a test period, for highest and lowest rankings services, having at least 10, 50 campaigns respectively; and FIG. 12 depicts past performances statistical data, during a test period, for highest and lowest rankings services among the most popular services.

Figure 13:
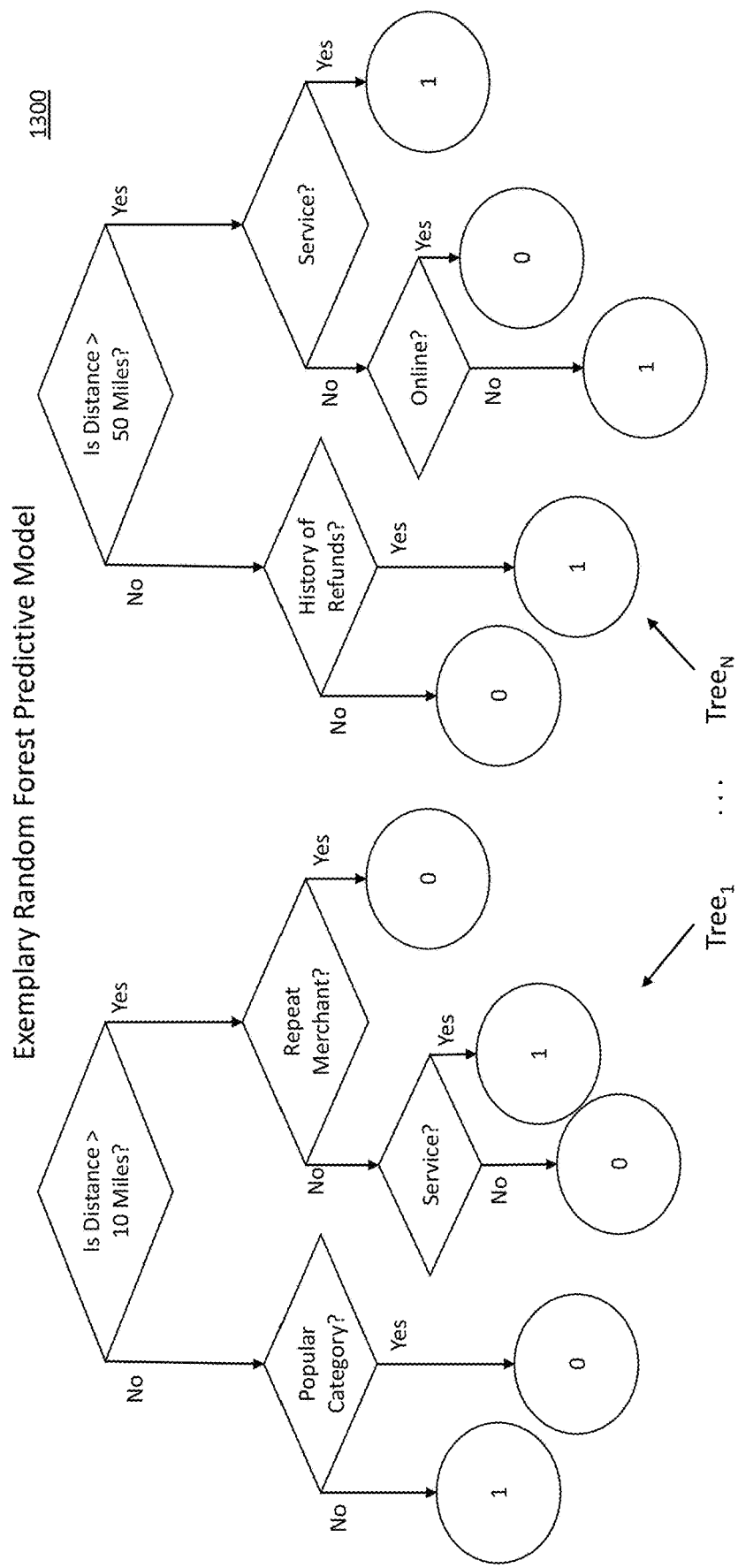

FIG. 13 illustrates an exemplary random forest model.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention generally relate to provider classification based on a return rate. For example, the methods, apparatus and computer program products described herein are operable to determine a provider return rate and/or whether a provider is likely to have a high return rate. A return may be a request for termination of an accepted promotion. For example, a request for termination of an accepted promotion may be an act of requesting a refund of the purchase price of a promotion that a consumer previously purchased. The return rate of a provider may be the percentage of promotions related to the provider that are returned. In one example, a provider return rate algorithm may classify a provider into one of two categories. In one category, a provider may be labeled a "bad provider" due to having attributes associated or correlated with previous providers having a high return rate.

Because analysis shows that a percentage of providers cause a disproportionately large amount of refunds, a promotion and marketing service can access, capture and/or store data related to providers with known return rates and utilize that information to determine likely return rates of other providers.

In one example, a promotion and marketing system may supply a data set to a learning machine or algorithm. The learning machine or algorithm may then determine which features or attributes of a provider correlate to a high return rate and which features or attributes correlate to a low return rate. Accordingly, the learning machine may select a subset of features or attributes for training. Once the learning machine or algorithm is trained, live data associated with a new provider may be input and the learning machine or algorithm may then classify the provider as likely to have a high return rate or not likely to have a high return rate. As such, the promotion and marketing system may determine how to proceed with a particular provider on a particular promotion. Alternatively, or additionally, in some example embodiments, the learning machine or algorithm may output a score or rating for each provider to enable the promotion and marketing system to make a choice between providers.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer or a promotion, participate in redemption, generate rewards, provide a point of sale device or service, issue payments to providers and/or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like, which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems. Throughout this specification, the terms "user device" and "consumer device" may be used interchangeably.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, it should be appreciated that the examples of discretionary data provided above may also be determined implicitly or through review or analysis of other electronic marketing information provided to the promotion and marketing service. It should also be appreciated that the promotion and marketing service may also grant access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limited to one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in-store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including, but not necessarily limited to, offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like, electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the terms "merchant self-service indicator" and "promotion context" relate to data associated with the merchant that may be used to classify the merchant or suggest promotion components to the merchant. A promotion context may include a plurality of merchant self-service indicators. For example, a promotion context may include multiple merchant self-service indicators that describe various features or characteristics of the merchant, such as a the type of industry of the merchant, the type of products or services sold by the merchant, the size of the merchant, the location of the merchant, the sales volume of the merchant, reviews and ratings for the merchant, or the like.

In some embodiments, the merchant self-service indicators are a result of analytics that allow for generation of promotions that are ideal for the particular merchant's circumstances. For example, the merchant self-service indicators may be used to identify optimal promotions for the particular merchant based on their exact location (e.g., the particular city street of the merchant as opposed to a wider range, such as a zip code), the merchant's exact products and services offered (e.g., pizzerias that only serve deep dish pizza, restaurants that become nightclubs after 11:00 pm), the merchant's price point (e.g., barbershops that charge more than $20 for a haircut), or the date or season of the year (e.g., offering ski equipment during the winter, or holiday themed promotions during the holiday season), or the like. These merchant self-service indicators may be used in a self-service process to identify promotion components that were used by other merchants that share one or more same or similar merchant self-service indicators. For example, after initial registration and verification, the promotion and marketing service may identify the merchant self-service indicators associated with the newly registered merchant, such as by looking up the merchant in a merchant database or by receiving the merchant self-service indicators directly from the merchant (e.g., by a fillable form). The merchant self-service indicators and promotion contexts may be used for classification of merchants. For example, such attributes may be used to identify weather a promotion for a specific merchant is likely to satisfy consumers (e.g., the promotion has 70% chance to satisfy consumers. It should be appreciated that the term "programmatically expected" indicates machine prediction of occurrence of certain events. For example, a "programmatically expected" number of satisfied users is a number determined by machine prediction specifying the expected number of users that will be satisfied with a promotion.

As used herein, the term "likelihood" refers to a measure of probability for occurrence of a particular event. For example, the likelihood that a customer is satisfied with a promotion may be a value associated with a specific scale. In some implementations, the machine predictions discussed above are based, at least in part, on the "likelihood" that an event will occur. Similarly, in some implementations, machine predictions are based on attributes associated with a merchant and an associated merchant promotion.

It should be appreciated that the terms "refund," "return," and "termination of an accepted promotion" imply canceling/reversal of a promotion that was accepted. For example, a user terminating, returning, and/or requesting a refund for an accepted promotion may be described by the act of returning goods or services received while requesting return of a purchase price for the promotion. In some implementations, the user may merely return, cancel, or void an electronic voucher or tender for a service or goods in exchange for a refund of a price paid by the user for an associated promotion.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like, of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, accuracy of data available, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services. For example, not providing promotions of merchants that will likely be terminated by users, ensures that the users only receive promotions that will likely satisfy each respective user. In turn, this reduces resources required to manage and provide promotions. By eliminating the processing required for terminations, and purchases that would result in terminations, the stress on processor 202 is substantially reduced. For example, since the numbers of operations performed by processor 202 are significantly reduced, the power consumption, and the processing power and speed requirements for processer 202 are also reduced. In turn the maintained and operational costs of circuitry 200 are also reduced.

In order to offer digital promotions through a promotion and marketing service, merchants manually engage with representatives of the promotion and marketing service to negotiate the components of the promotions to be offered to consumers by the promotion and marketing service. Initial registration and setup to allow a merchant to provide promotions using a promotion system is typically a lengthy and involved process. This process may include separate steps by representatives of a promotion and marketing service to verify that a user who wishes to create a promotion is an authorized representative of the merchant, and that promotion offers prepared by the merchant are valid and likely to be of interest to consumers.

Even though promotions are tailored to different merchants, the inventors have identified that still an extremely small percentage of providers cause a disproportionately large amount of refunds. Accordingly, being able to accurately classify merchants based on the likelihood that their corresponding offers will result in terminations can be very useful for determining whether to offer a promotion of a specific merchant. Being able to selectively offer a promotion of merchants, allows for offering of higher quality promotions that are likely to satisfy consumers. This, in turn, is reflected on the resources required to operate and maintain the promotional service. For example, by providing only promotions that are likely to satisfy consumers, increases the processing efficiency of and reduces the stress on exemplary circuitry 200. In some implementations, this can result in faster processing and response times, which in turn improve the consumer experience.

The inventors have therefore determined that existing electronic systems for classifying merchants fails to accurately and efficiently address these issues. As a result of these problems and others that may arise from time to time, delays and inefficiencies may be introduced into the classification process, which in turn may be reflected on user satisfaction and overall revenue generated. The inventors identified a set of attributes that when incorporated in a machine prediction system can accurately and efficiently predict a likelihood that transmittal of a promotions of a specific merchant will result in a high number of terminations. As result, the predictions and classifications above may be utilized to significantly improve the user experience by providing additional merchant options, the merchant experience, and increase the overall revenue associated with offering promotions.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Example Apparatus for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, merchant classifier circuitry 210, promotion termination prediction circuitry 212, and promotion acceptance predication circuitry 214. The apparatus 200 may be configured to execute the operations described above with respect to FIG. 1 and below with respect to FIGS. 3-4, 6-7, and 9A-9B. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Merchant classifier circuitry 210 includes hardware configured to identify and determine classifications for merchants. The merchant classifier circuitry 210 may utilize processing circuitry, such as the processor 202, to perform these actions. The merchant classification circuitry 210 may receive data from promotion termination prediction circuitry 212. In some implementations, the received data may be a normalized score indicative of a probability that an accepted promotion will be terminated. For example, a termination of a promotion may be a request for return of merchandise accompanied by a request for a refund. However, it should also be appreciated that, in some embodiments, the merchant classification circuitry 210 may include a separate processor, specially configured field programmable gate array (FPGA), or application specific interface circuit (ASIC) to classify, update classifications of merchants, and train and use a machine learning model for merchant classification. In some implementations, merchant classification circuitry 212, described below, may be sub-circuitry belonging to merchant classification circuitry 210. The merchant classification circuitry 210 may be implemented using hardware components of the apparatus configured by either hardware or software for implementing these planned functions.

Promotion termination predication circuitry 212 includes hardware configured to identify and determine a prediction that a promotion will be terminated. In some implementations, the prediction is specified as a probability or likelihood that the promotion will be terminated. The promotion termination predication circuitry 212 may utilize processing circuitry, such as the processor 202, to perform these actions. However, it should also be appreciated that, in some embodiments, the promotion termination prediction circuitry 212 may include a separate processor, specially configured field programmable gate array (FPGA), or application specific interface circuit (ASIC) for determining a prediction specifying a likelihood that a promotion will be terminated. Similarly, promotion acceptance prediction circuitry 214 includes hardware configured to identify and determine a prediction that a promotion will be accepted. Such prediction may also be specified as a probability or a likelihood. Again, it should also be appreciated that, in some embodiments, the promotion acceptance prediction circuitry 214 may include a separate processor, specially configured field programmable gate array (FPGA), or application specific interface circuit (ASIC) for determining a prediction specifying a likelihood that a promotion will be accepted. Circuitry 212 and 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, historical data, review data and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions. Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximizing the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated, however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server by allowing classification of merchants more efficiently and accurately. In turn, this reduces the server stress. For example, by eliminating business with merchants that are highly likely to have many terminations, the server reduces the processing associated with offering promotions of such merchants and the processing associated with the terminations. In turn, the processing power requirement of the server is reduced.

Example Processes for Merchant Classification

As described, a promotional and marketing service may utilize the internet to provide consumers with available promotions related to products, services or experiences offered by providers that may be of interest. However, determining which providers to engage poses a risk. A promotion and marketing service may spend limited resources finding, engaging, maintaining and paying a provider. Some providers end up being a bad investment, because consumers may request refunds on the purchases of promotions related to certain providers. Research shows an extremely small percentage of providers cause a disproportionately large amount of refunds. For example, analysis shows that 7% of existing providers cause over 40% of refunds. Other research shows that 0.2% of providers cause 20% of refunds.

Figure 4:
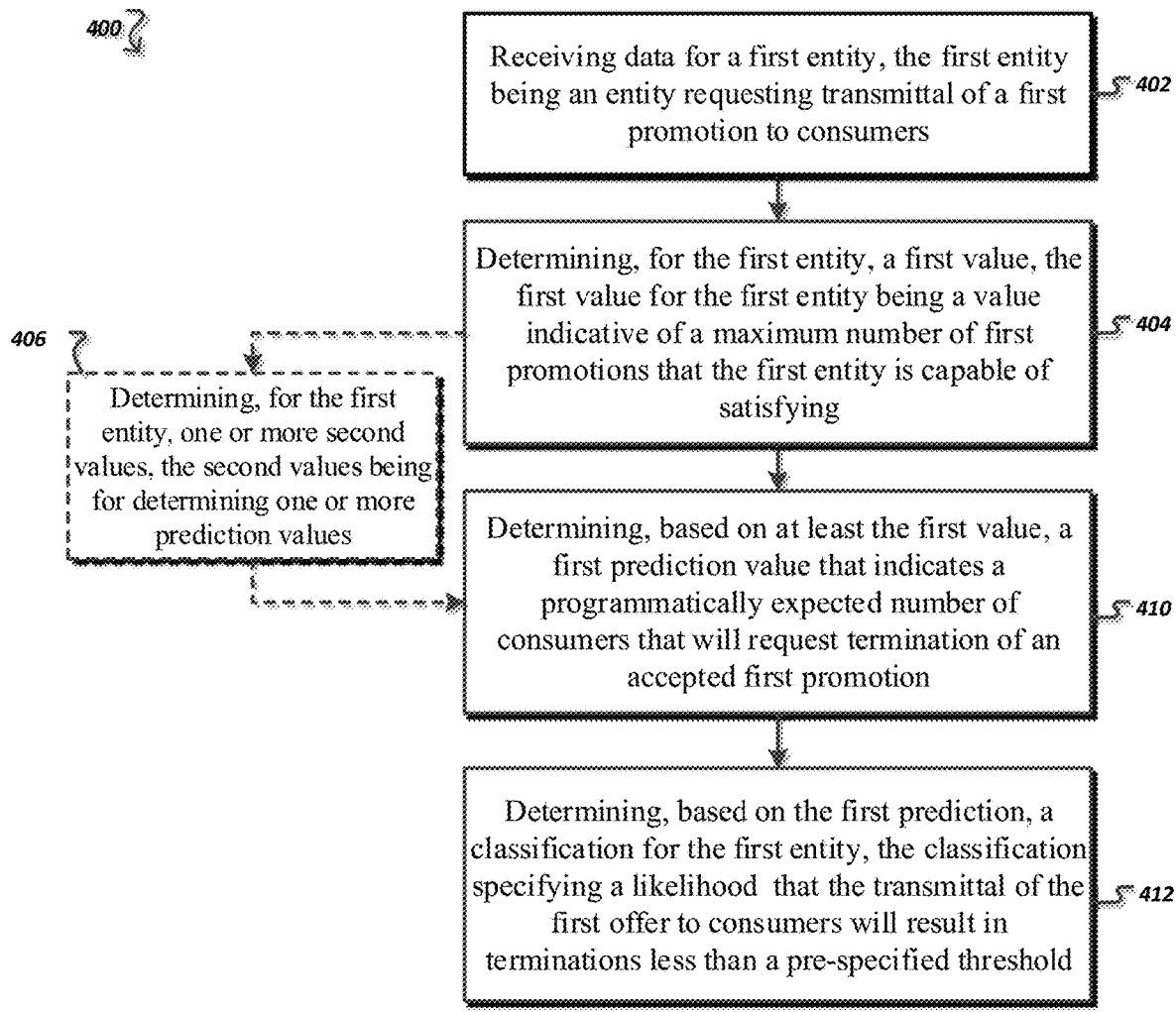

Naturally, the ability to accurately predict refund rates of providers can significantly improve revenue and user satisfaction. As described, both consumers and promotional and marketing services can benefit greatly from such accurate predictions. Accordingly, there exists a dire market need for methods and systems that can accurately predict quality of providers and classify providers accordingly FIG. 4 is a flow chart of an example process 400 for classifying merchants. The process 400 begins with receiving data for a first entity, the first entity being an entity requesting transmittal of a first promotion to consumers (402). In some implementations, the first entity is a merchant offering a first promotion for offerings of the merchant. For example, the first entity may be a department store that is requesting transmittal of a promotion for goods (e.g., clothing, shoes, toys, food items, camping equipment) offered by the department store. In some implementations, the promotion may be for any of the goods offered by the department store. In some implementations, the promotion may be for a specific type of goods offered by the department store (e.g., camping equipment). In some implementations, the promotion may be for a specific item, such as, a bike. Similarly, the first entity may be a service store, such as a hair salon or a car repair shop. In such implementations, the service store may request transmittal of promotion for services provided by the store (e.g., haircut, hair coloring, oil change). In some implementations, stores may offer a combination of services and goods.

The process 400 continues with determining, for the first entity, a first value, the first value for the first entity being a value indicative of a maximum number of first promotions that the first entity is capable of satisfying (404). For example, the process 400 may access information specifying a number of bikes available for sale through the promotion. This information may be provided by the department store along with the request for transmittal of the promotion. Alternatively, this information may be provided in response to a real-time request by the system performing process 400. As the department store may be continuously selling bikes through different avenues, the number of available bikes may be changing frequently. Similarly, a hair salon may have a limited capacity and accordingly may only be able to provide services to a limited number of customers. That number may be provided to the system performing process 400 in a manner similar to the above.

Step 406, shown in phantom or dashed lines, is an optional step of process 400. The process 400 may continue with determining, for the first entity, one or more second values, the second values being for determining one or more prediction values (406). In some implementations, the second value may be a location value. For example, the second value may be a value specifying a distance away from a center of a city where the promotion is available for redemption. Other examples and implementations details for the second values will be discussed in more detail below.

The process 400 continues with determining, based on at least the first value, a first prediction value that indicates a programmatically expected number of consumers that will request termination of an accepted first promotion (410). For example, the process 400 may predict using one or more decision trees, based at least on the first value indicating the number of promotions that the department store can satisfy a number of consumers that will request a refund for an accepted promotion. In some implementations, the programmatically expected number of consumers that will request termination of an accepted promotion is in the form of a percentage of accepted promotions.

Finally, the process 400 determines, based on the first prediction, a classification for the first entity, the classification specifying a likelihood that the transmittal of the first offer to consumers will result in terminations less than a pre-specified threshold (412). For example, the department store may be classified as a "negative," "high risk" or "bad merchant" in response to predicting that the 50% of accepted promotions will be terminated. Similarly, the department store may be classified as a "positive" "low risk" or "good merchant" in response to predicting that only 1% of accepted promotions will be terminated. In some implementations, the prediction value is used to generate a normalized merchant score between the values of 0 and 1. The merchant score may represent a probability or likelihood that a merchant will have 20% refunds or higher. A cutoff score or percentage may be specified by the promotional service performing process 400. For example, a cutoff score of 0.7 or higher may result in a negative classification. Similarly, a corresponding return rate of 20% or higher may result in a negative classification. Naturally, a cutoff percentage or score may be customized in order to maximize revenue and eliminate merchants that would likely result in a negative consumer experience.

FIG. 5 depicts an example graphical representation of a statistical distribution for the refund rates over a 120 day period. This distribution may be utilized to customize the cutoff score and percentage. For example, with reference to FIG. 5, the cutoff score of 0.7 may result in flagging only 1-2% of merchants as "negative," "high risk" or "bad merchants." However, a cutoff score of 0.025 may flag 90% of merchants as such. Accordingly, careful selection of a cutoff frequency dictates how many merchants are flagged as "negative," "high risk" or "bad merchants." Different promotional services may select different cutoff scores to meet their business needs and the needs of their consumers. As described, the cutoff score may be selected based on statistical historical data for the refund rates over a pre-specified period of time.

Figure 6:
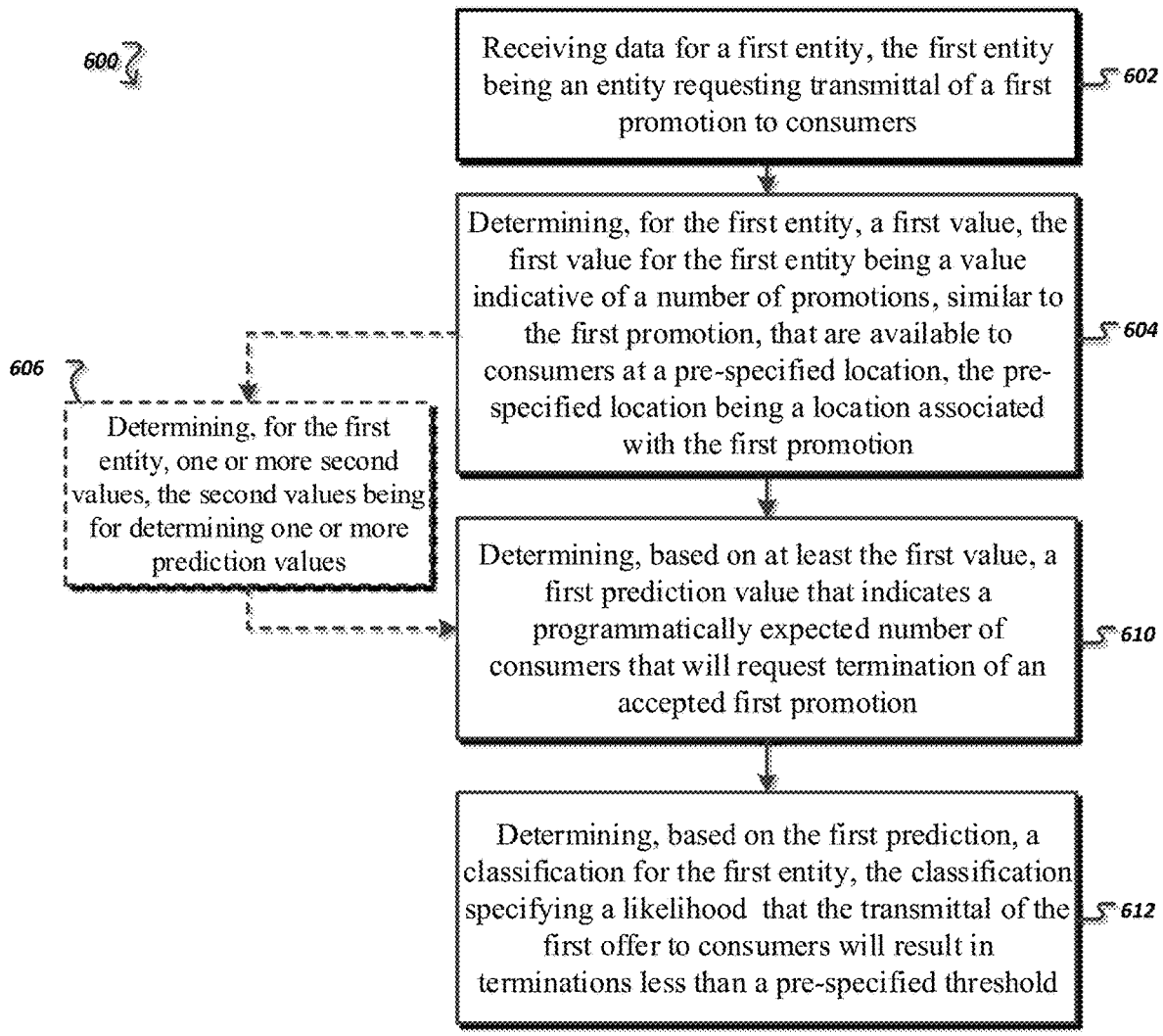

FIG. 6 is a flow chart of an example process 600 for classifying merchants. The process 600 begins with receiving data for a first entity, the first entity being an entity requesting transmittal of a first promotion to consumers (602). In some implementations, the first entity is a merchant offering a first promotion for offerings of the merchant. For example, the first entity may be a department store that is requesting transmittal of a promotion for goods (e.g., clothing, shoes, toys, food items, camping equipment) offered by the department store. In some implementations, the promotion may be for any of the goods offered by the department store. In some implementations, the promotion may be for a specific type of goods offered by the department store (e.g., camping equipment). In some implementations, the promotion may be for a specific item, such as, a bike. Similarly, the first entity may be a service store, such as, a hair salon or a car repair shop. In such implementations, the service store may request transmittal of promotion for services provided by the store (e.g., haircut, hair coloring, oil change). In some implementations, stores may offer a combination of services and goods.

The process 600 continues with determining, for the first entity, a first value, the first value for the first entity being a value indicative of a number of promotions, similar to the first promotions that are available to consumers at a pre-specified location, the pre-specified location being a location associated with the first promotions (604). For example, the process 600 may access information specifying a number of promotions that belong to a same category as the first promotions and are offered within a proximate location. With reference to the hair salon example, the process 600 may access information specifying a number of different hair salon promotions that are available within a 10 mile radius from the hair salon. Similarly, with reference to the bike promotion example, the process 600 may access information specifying a number of bike promotions available within a 50 mile radius from the department store. In some implementations, the process 600 may access information specifying a number of similar promotions in the same city as the first promotion. In some implementations, the process 600 may access information specifying a number of similar promotions within neighboring cities. It is understood that location associated with the first offer may be specified by the promotional agency in order to meet their business and customer needs.

Step 606, shown in phantom or dashed lines, is an optional step of process 600. The process 600 may continue with determining, for the first entity, one or more second values, the second values being for determining one or more prediction values (606). In some implementations, the second value may be a potential value. For example, the second value may be a value specifying a number of potential consumers within a location proximate to the location of the merchant offering the promotion. In some implementations, the potential value may be a total number of subscribers to the promotional service within an area including the merchant offering the promotion. Other examples and implementations details for the second values will be discussed in more detail below.

The process 600 continues with determining, based on at least the first value, a first prediction value that indicates a programmatically expected number of consumers that will request termination of an accepted first promotion (610). For example, the process 600 may predict using one or more decision trees, based at least on the first value indicating the number of promotions that the department store can satisfy a number of consumers that will request a refund for an accepted promotion. In some implementations, the programmatically expected number of consumers that will request termination of an accepted promotion is in the form of a percentage of accepted promotions.

Finally, the process 600 determines, based on the first prediction, a classification for the first entity, the classification specifying a likelihood that the transmittal of the first promotion to consumers will result in terminations less than a pre-specified threshold (612). For example, the department store may be classified as a "negative," "high risk" or "bad merchant" in response to predicting that the 30% of accepted promotions will be terminated. Similarly, the department store may be classified as a "positive" "low risk" or "good merchant" in response to predicting that only 3% of accepted promotions will be terminated. In some implementations, the prediction value is used to generate a normalized merchant score between the values of 0 and 1. The merchant score may represent a probability or likelihood that a merchant will have 20% refunds or higher. A cutoff score or percentage may be specified by the promotional service performing process 600. As described above with reference to FIG. 5, a cutoff percentage or score may be customized in order to maximize revenue and eliminate merchants that would likely result in a negative consumer experience.

Figure 7:
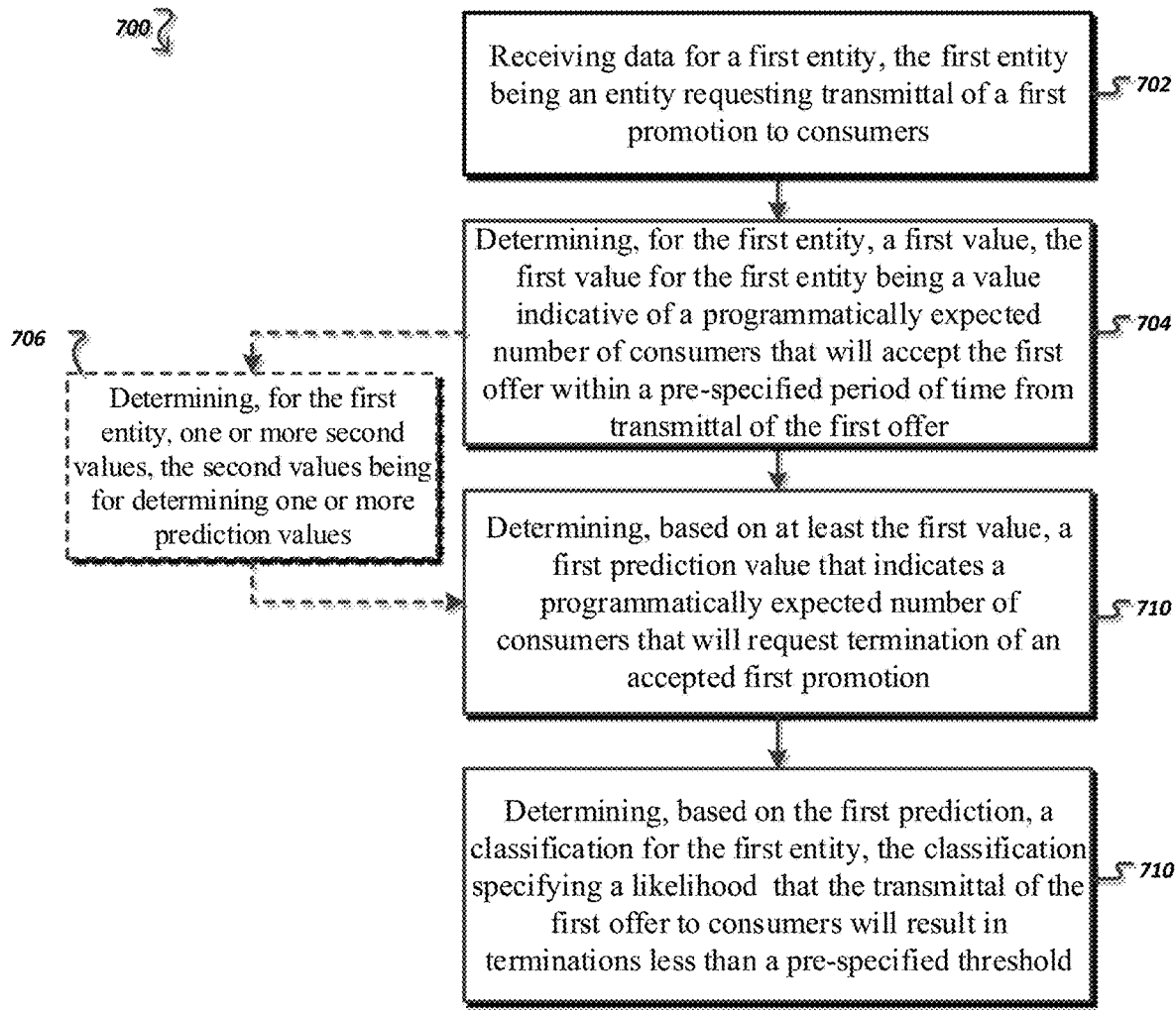

FIG. 7 is a flow chart of an example process 700 for classifying merchants. The process 700 begins with receiving data for a first entity, the first entity being an entity requesting transmittal of a first promotion to consumers (702). In some implementations, the first entity is a merchant offering a first promotion for offerings of the merchant. For example, the first entity may be a department store that is requesting transmittal of a promotion for goods (e.g., clothing, shoes, toys, food items, camping equipment) offered by the department store. In some implementations, the promotion may be for any of the goods offered by the department store. In some implementations, the promotion may be for a specific type of goods offered by the department store (e.g., camping equipment). In some implementations, the promotion may be for a specific item, such as a bike. Similarly, the first entity may be a service store, such as, a hair salon or a car repair shop. In such implementations, the service store may request transmittal of promotion for services provided by the store (e.g., haircut, hair coloring, oil change). In some implementations, merchants may offer a combination of services and goods.

The process 700 continues with determining, for the first entity, a first value, the first value for the first entity being a value indicative of a programmatically expected number of consumers that will accept the first offer within a pre-specified period of time from transmittal of the first offer (704). For example, the process 700 may utilize a machine learning algorithm to predict a number of consumers that will accept the first offer within the first 30 days the offer is available. With reference to the hair salon example, the process 700 may predict the number of consumers that are programmatically expected to accept the hair salon promotion within the first 30 days. In some implementations, the process 700 may predict the number of consumers that are programmatically expected to accept the first offer within 60 or 120 days. It is understood, that the process 700 may use different pre-specified periods to meet the needs of the promotional service and the consumers.

The programmatically expected number of consumers may be predicted based on different attributes. For example, the prediction may be based on historical data, type of promotion, location, competitive offers. These and/or different attributes may be used for the prediction. In some implementations, unsupervised machine learning is used to predict the programmatically expected number of consumers that will accept the promotion. In some implementations, supervised machine learning is used to predict the programmatically expected number of consumers that will accept the promotion. In some implementations, the predicted number of consumers is converted to a normalized score between 0 and 1 ("hero" score). The "hero" score is indicative of an expected performance for the promotion. For example, a score of 0.9 may indicate an excellent performance, while a score of 0.01 may indicate a failing performance. In some implementations, the programmatically expected number of consumers is predicted based on a random forest model. Random forest models are discussed in more detail below. In some implementations, the programmatically expected number of consumers is predicted, in manner similar to prediction of the programmatically expected number of terminations described throughout the specification.

Step 706, shown in phantom, is an optional step of process 700. The process 700 may continue with determining, for the first entity, one or more second values, the second values being for determining one or more prediction values (706). In some implementations, the second value may be a location value. For example, the second value may be a value specifying a distance away from a center of a city where the promotion is available for redemption. Other examples and implementations details for the second values will be discussed in more detail below.

The process 700 continues with determining, based on at least the first value, a first prediction value that indicates a programmatically expected number of consumers that will request termination of an accepted first promotion (710). For example, the process 700 may predict using one or more decision trees, based at least on the first value indicating the number of promotions that the department store can satisfy a number of consumers that will request a refund for an accepted promotion. In some implementations, the programmatically expected number of consumers that will request termination of an accepted promotion is in the form of a percentage of accepted promotions.

Finally, the process 700 determines, based on the first prediction, a classification for the first entity, the classification specifying a likelihood that the transmittal of the first promotion to consumers will result in terminations less than a pre-specified threshold (712). For example, the department store may be classified as a "negative," "high risk" or "bad merchant" in response to predicting that the 30% of accepted promotions will be terminated. Similarly, the department store may be classified as a "positive" "low risk" or "good merchant" in response to predicting that only 3% of accepted promotions will be terminated. In some implementations, the prediction value is used to generate a normalized merchant score between the values of 0 and 1. The merchant score may represent a probability or likelihood that a merchant will have 20% refunds or higher. A cutoff score or percentage may be specified by the promotional service performing process 700. As described above with reference to FIG. 5, a cutoff percentage or score may be customized in order to maximize revenue and eliminate merchants that would likely result in a negative consumer experience. For example, statistical analysis of past performances and the past performance association with various attributes may be used to determine optimized cutoff scores and percentages.

FIGS. 10A and 10B depict past performances statistical data, during a test period, for highest and lowest rankings divisions among all and only large divisions, respectively. The Average Refund Rate (avg. RFR) specifies an average refund or termination rate for each division. The number of campaigns (# of camp) specifies the number of active campaigns within a corresponding division during a test period. As shown in FIG. 10A Macon and Miami rank among the divisions having the highest overall return rates. However, during the test period Miami had 329 active campaigns while Macon only had 7. FIG. 10B shows similar statistical data and rankings but only for divisions having a number of campaigns exceeding a pre-specified threshold. For example, the pre-specified threshold may be 290 campaigns. Similarly, the lowest return rates are shown in FIGS. 10A and 10B. This statistical data may be used to determine an optimized cutoff score or percentage.

FIGS. 11A and 11B depict past performances statistical data, during a test period, for highest and lowest rankings services, having at least 10, 50 campaigns respectively. FIG. 12 depicts past performances statistical data, during a test period, for highest and lowest rankings services among the most popular services. This statistical data may be used to determine optimized cutoff scores or percentages, as described above. Additionally, this statistical data may be used to determine the most important attributes as will be discussed in the following section in more detail.

Example Merchant Classification Attributes and Selection Processes

FIG. 8 shows a list of example attributes, for classifying merchants, and an associated ranking indicating a measure of importance of each attribute. For example, the attribute "service_header" specifying the type of service for a promotion is highly ranked. Therefore, the "service_header" attribute is an important and effective attribute for predictions and merchant classifications. Similarly, the attribute "subs_within5," indicating a number of subscribers available within a 5 mile radius of the merchant offering the promotion, is also highly ranked. Accordingly the "subs_within5" attribute is an important and effective attribute for predictions and merchant classifications. On the other hand, the attribute "yelp_rating," specifying a quantifiable rating for merchants is not highly ranked. Therefore, the attribute "yelp_rating" may not be the most important and effective attribute for predictions and merchant classifications. That being said, non-highly ranked attributes may be effective as secondary attributes (406, 606, 706) that complement important attributes for predictions and merchant classifications. Similarly, highly ranked attributes may be effective as secondary attributes (406, 606, 706) that complement important attributes for predictions and merchant classifications. It should be understood that each of the attributes discussed in this application, may be in some embodiments, may be a primary or a secondary attribute. A list of exemplary attributes is provided below.

In some implementations, one attribute may represent category data, specifically beauty, wellness and healthcare. To determine a normalized value of the one attribute, an algorithm may be executed on associated raw data related to a merchant. For example, if the category data associated with a provider is "beauty, wellness and healthcare," the value of the one attribute is 1. If the category data associated with a provider is not "beauty, wellness and healthcare," the value of the one attribute is 0.

As can be seen in FIG. 8, a number of example attributes relate to category data and sub-category data. There is also a number of attributes related to location data. It should be understood that attribute data related to location and hyper location data may be generated in a similar fashion. For example, if the location data associated with a provider is "Chicago," the value of a corresponding attribute may be 1. If the category data associated with a provider is not "Chicago," the value of the corresponding attribute may be 0.

It should also be understood that merchants may have associated data indicating one or more categories, sub-categories, location, hyper-locations, prices or the like. For example, a provider, such as a gym, may be associated with category data such as "beauty, wellness, and healthcare," "Food and drink," "Leisure Offers and Activities" and/or "Services." A gym may also have more than one location, and may be able to provide promotions in a variety of price ranges and time frames.

FIG. 8 also shows example attribute data associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider. For example, providers from different locations (e.g., different countries, states, neighborhoods or the like) may be associated with different attribute data. For example, different countries have different credit reporting rules and agencies. Thus, a promotion and marketing system may utilize a first combination of attributes for a provider in a first location, hyper-location, category or sub-category and a second combination of attributes for a provider in a second location, hyper-location, category or sub-category.

In one implementation, other attribute data may be used. For example, attribute "bad category" may relate to identifying providers who offer products, services, and/or other offerings in one or more categories categorized as having high return rates based on prior performance data. The feature may be normalized such that if the sub-category of the provider is associated with high return rates, the attribute is 1, else the attribute is 0. Other example attributes are "bad market," which may be normalized such that if the provider is located in a location and/or hyper local region associated with high return rates, the attribute is 1, else the attribute is 0. Another example feature is "average price for sub-category" and "number of website provider has rating".

Additionally or alternatively, some implementations may include at least one of "years in file" indicating the number of years a provider has been in business, "judgment count" indicating a number of judgments, "median credit" indicating a median credit score, and/or "provider stability risk score" indicating a provider's stability risk score. In another example embodiment, additional features may include demographic features, such as census data. For example, demographic features related to income, education level, ethnicity, etc. in a location and/or hyper local region that the business is located. In some embodiments, a judgment is received from a credit bureau.

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to a merchant offering a promotion for providing a service, attributes specifying past performance data for (1) the same merchant and the same service, (2) only the same merchant, (3) only the same service may be clustered under attribute header "past performance."

In some implementations, the header attributes are ranked according to the overall importance and effectiveness of the attributes belonging to the header attribute. Table A shows an example ranking of header attributes.

TABLE A

| Rank | Type | Features |
|------|------|----------|
| 1 | location | division, distance to city, etc. |
| 2 | past performance | same merchant & service, same service, same merchant, etc. |
| 3 | category & service | service header, primary deal service, etc. |
| 4 | potential consumers | Subs_within5, n_div_users, n_div_subs., etc. |
| 5 | maximum capacity | units_avail, etc. |
| 6 | hero score | predicted 30 day bookings, predicted 60 day bookings, etc. |
| 7 | review data | yelp_n_review, yelp_rating, yelp_avil, google_n_review, facebook_fans, etc. |

Below is a list of exemplary attributes for predictions and merchant classification:
service—the service part of the (merchant, service) tuple.
category—the category (higher-level taxonomy) of this score's service.
ran_aftr_comp—whether the merchant has run with a competitor.
first_comp_tbtw—number of days since first competitor feature.
competitor_name—name of the first competitor that the merchant ran a feature with.
first_comp_units—number of units sold on first competitor feature.
first_comp_gr—gross revenue from first competitor feature.
first_comp_wapp—Weighted average price point from first competitor feature.
n_comp_runs—number of times the merchant has run with competitors.
last_comp_tbtw—days since the last competitor feature.
research_ranking—research ranking.
region_name—the merchant's region.
lead_source—the introductory source of the merchant, (e.g. cold call, merchant research).
permalink—merchant's division permalink.
peer_group—the "peer group" (1-8) of the merchant's division.
deal_count—deal count available in merchant's division/PDS 7 days ago.
units_avail—"Stocked" units available in merchant's division/PDS 7 days ago.
top_merchant_campaign—whether the merchant was identified in a Top Merchant Campaign (TMC).
subs_within5—the number of subscribers within 5 miles of the merchant's locations.
is_hotspot—whether or not the merchant is in a city "hot spot."
distance_to_division_center—the average distance from the merchant's location to the center of the division.
website_exists—whether or not merchant has a website.
hyperlocal_rank—the rank of subscriber density (1-15) of the merchants' locations.
n_locations—the number of distinct zip codes the merchant has locations within.
subdivision_pg—the peer group (1 largest through 7 smallest) of a subdivision in which a past campaign by this merchant ran.
yelp_rating—the number of Yelp stars.
yelp_n_reviews—the number of Yelp reviews.
facebook_fans—the number of Facebook fans.
google_n_reviews—the number of Google reviews.
google_rating_nrm—the number of Google stars.
num_other_sources—the number of other review sources.
idealized_price—the ideal weighted average price point.
idealized_discount—the ideal discount.
n_div_users—the number of users in the division.
n_div_subscribers—the number of subscribers in the division, identical/very close to n_div_users.
service_header—more rarified taxonomy info.
pop_service_header—'other' if not popular, otherwise the name of the header.
comp_prediction—linear prediction based on market/category/competitor of how well the merchant will do based on competitor performance.
roll12mo_users—the number of users who have purchased this service in the last 12 months.
roll12mo_user_2p—the number of users who have purchased this service multiple times in the last 12 months.
roll12mo_users_2p_pct—the ratio of the above two features.
tbtwrun—the last time the service was run in this division.
factual_rating—a merchant's factual.com rating, 0.0-5.0 by 0.5 increments.
factual_price—a price on a scale of 1-5, 5 is more expensive.
ta_n_ratings—the number of ratings a merchant has on TripAdvisor.
ta_rating—the average TripAdvisor rating for the merchant.
yelp_price—the number of dollar signs on the merchant's yelp page.
avg_all_prior_60d—the average 60-day refund rates for all the merchant's past campaigns.
avg_all_prior_120d—the average 120-day refund rate for all the merchant's past campaigns.
avg_same_service_prior_60d—the average 60-day refund rate for all the merchant's past campaigns in that service.
avg_same_service_prior_120d—the average 120-day refund rate for all the merchant's past campaigns in that service.
prior_campaigns—number of campaigns that merchant ran in the past. a campaign is a collection of deals of the same structure and from the same merchant that have launched in a similar timeframe.
prior_deals—number of deals the merchant has run in the past.
prior_six—a value indicative of an overall potential for a given service in the merchant's geography over the last six months. The average 30 day bookings for this service in the merchant's division may be calculated. In order to deal with small sample sizes, there are a series of fall backs: 1) service/division, 2) service/peer group, 3) header/division, 4) header/peer group, 5) service/nation, 6) header/nation. Once a group with at least 20 samples is located, the average of that group is determined.
prior_three—same as prior_six, but for the last 3 months.
avg_percentile_prior_60d—for each campaign in the past, the percentile for how it ranks against the other deals in that 60 days period is calculated. For each merchant the average percentile of all their past campaigns is calculated.
avg_percentile_prior_120d—for each campaign in the past, the percentile for how it ranks against the other deals in that 120 days period is calculated. For each merchant the average percentile of all their past campaigns is calculated.
avg_svc_percentile_prior_60d—the merchant's average percentile of all past campaigns in that service.

avg_svc_percentile_prior_120d—the merchant's average percentile of all past campaigns in that service.

These attributes and others may be computed periodically (e.g., daily, weekly, and monthly) for merchants. The clustered or the non-clustered attributes may be used to train a machine learning model. It should be understood that the selection of attributes or clusters of attributes for training machine learning models or for merchant classification processes can greatly affect the respective performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

In some implementations, the merchant classification process is performed according to a random forest model. The model may operate by constructing multiple decision trees at training. Each decision tree may be based on different attributes. In some implementations, the random forest model output is the mode of classes or the most occurring class among all the trees of the random forest. In some implementations, the random forest model is trained with historical data associated with various attributes. In some implementations, different trained models may be utilized for different locations and/or types of merchants.

Figure 9A:
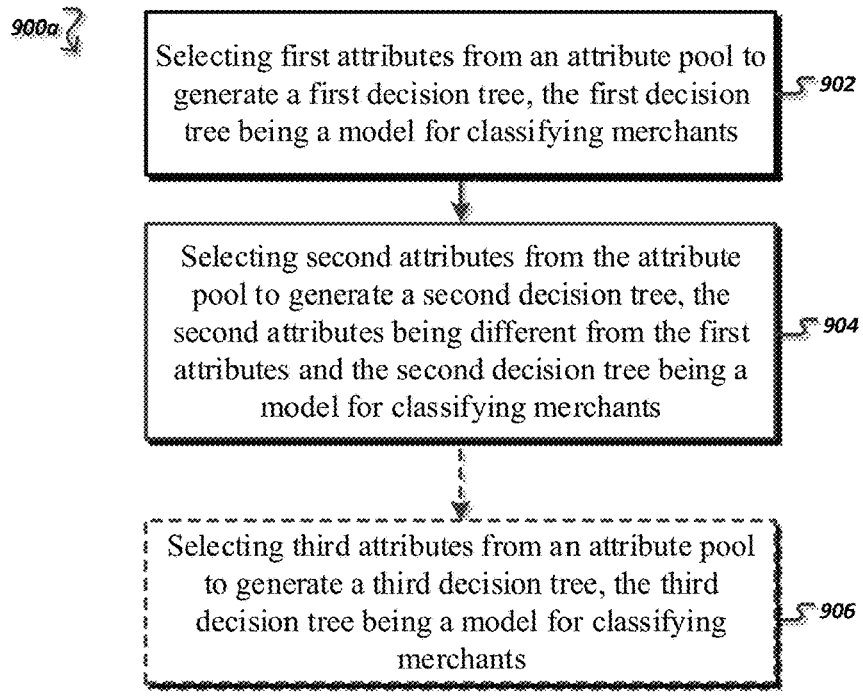

FIG. 9A is a flow chart of an example process 900a for training a merchant classification model based on selected merchant attributes. The process 900a begins with selecting first attributes from an attribute pool to generate a first decision tree, the first decision tree being a model for classifying merchants (902). For example, the process 900a may select all "location" attributes and the "subs_within5" attribute and/or other attributes or clusters of attributes. The selected first attributes are used to generate a decision tree for classifying merchants. In some implementations, the selection is based on a machine learning algorithm. In some implementations, the attributes are selected based on statistical analysis of past performances. In some implementations, the pool of attributes comprises one or more of the list of exemplary attributes above. In some implementations, the pool of attributes includes one or more of the clustered attributes of Table A.

The process 900a continues with selecting second attributes from the attribute pool to generate a second decision tree, the second attributes being different from the first attributes and the second decision tree being a model for classifying merchants (904). The second attributes are selected in a manner similar to step 902. In some implementations, the second attributes are different from the first attributes. The selected second attributes are then used to generate a second decision tree. In some implementations, the process 900a continues with optional step 906 shown in phantom. The process 900a may select third attributes from an attribute pool to generate a third decision tree, the third decision tree being a model for classifying merchants (906).

In some implementations, the third attributes are different from the first and second attributes. In some implementations, the third attributes are then used to generate a decision tree. In some implementations, each generated tree is unique. In some implementations, additional trees are generated based on other selections of attributes. In some implementations, the process 900a may generate trees based on unique attribute selections until a threshold number of trees are generated. In some implementations, the process 900a may generate trees based on unique attribute selections until the classification model is stable and accurate.

Figure 9B:
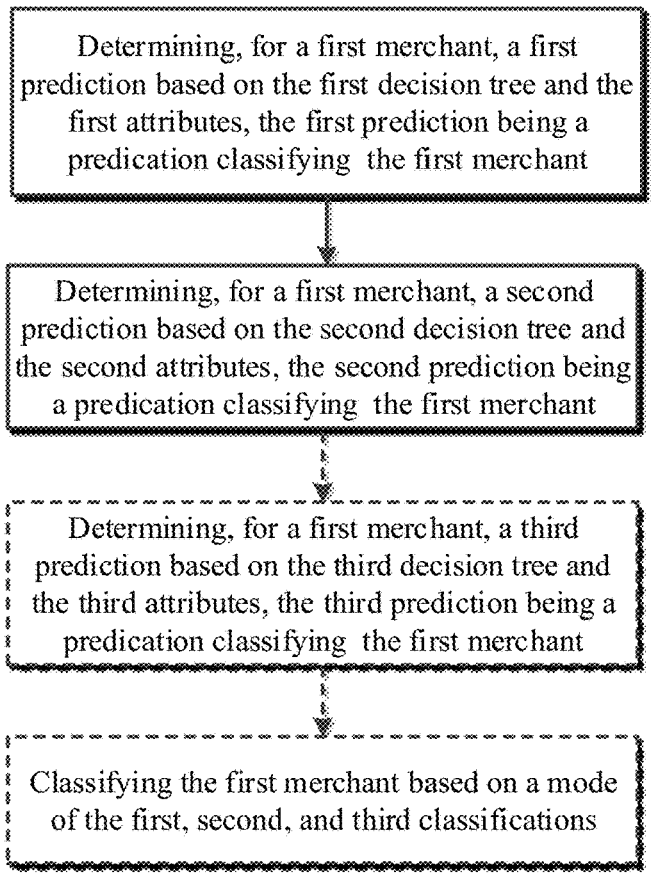

FIG. 9B is a flow chart of an example process 900b for classifying merchants, according to a model trained based on selected attributes. The process 900b begins with determining, for a first merchant, a first prediction based on the first decision tree and the first attributes, the first prediction being a predication classifying the first merchant (908). For example, the process 900b may determine a first prediction classifying the first merchant based on the "location" attributes and the "subs_within5" attribute and/or other attributes or clusters of attributes. For example, the first classification may classify the merchant as a "positive," "low risk" or "good merchant."

The process 900b continues with determining, for a first merchant, a second prediction based on the second decision tree and the second attributes, the second prediction being a predication classifying the first merchant (910). For example, the second classification may also classify the merchant as a "positive" "low risk" or "good merchant." In some implementations, the process 900b may continue with classifying the first merchant based on a mode of, at least, the first and second classifications (914). For example, since both the first and second classifications "positive," "low risk" or "good merchant" the first merchant may be classified as "positive" "low risk" or "good merchant" because the mode of the first and second classifications is such.

In some implementations, the process 900b includes optional step 912 shown in phantom. The process 900b may determining, for a first merchant, a third prediction based on the third decision tree and the third attributes, the third prediction being a predication classifying the first merchant (912). In such implementations, the process 900b includes the third classification in determining the mode of the classification trees. In some implementations, the additional classifications of additional trees may also be used to calculate the mode. In turn, the first merchant is classified according to the mode. For example, out of five total classifications, if the first, third and fourth classifications are "negative," "high risk" or "bad merchant," while the second and fifth classifications are "positive," "low risk" or "good merchant," the final classification for the merchant would be "negative," "high risk" or "bad merchant."

FIG. 13 illustrates an exemplary random forest model for use with the present system, according to one embodiment. The model includes features such as distance, the popularity of a category of service or product, whether the promotion relates to a service, whether the merchant has offered a promotion before, whether the type of promotion has a high history of refunds, and whether the product is available online.

The exemplary random forest 1300 is composed of N trees, where N is a number. The prediction of the random forest is the average of the predictions from the N trees. The prediction from a tree is determined by a root node decision (e.g., distance to provider or product) and then traversing a logic path through the tree to a terminal leaf node based on the decision outcome determined at each successive node along the path. For example, in a model comprised of N trees where N is 5, the random forest prediction is the average of all of the trees. Based on a certain threshold, for example 0.5, the merchant is classified as "high risk" or "low risk." By way of further example, if a promotion is less than 10 miles from a potential customer and the category of promotion is historically popular, the merchant may receive a score of "0." As another example, if the promotion is more than 50 miles from the potential customer, and is a service (i.e., requires the customer to travel to the site), the merchant may receive a score of "1." The exemplary random forest 1300 prediction is the average of the respective predictions from trees 1, 2, 3, 4, and 5. In one example, tree 1 results in a score of "1," tree 2 results in a score of "0," tree 3 results in a score of "0," tree 4 results in a score of "0," and tree 5 results in a score of "1." The average of the scores is (1+1)/5 or 0.4. Assuming an exemplary threshold for a high risk merchant is 0.5, (e.g., if the score is greater than or equal to 0.5, the merchant is considered "high risk"), the merchant in this example is classified as "low risk."

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation

The invention claimed is:

1. A system, comprising:
a data processing apparatus; and
a computer memory apparatus in data communication with the data processing apparatus and storing instructions executable by the data processing apparatus and that upon such execution cause the data processing apparatus to perform operations comprising:
   determining attributes for promotions offered via a promotion and marketing service system;
   selecting a subset of the attributes from an attribute pool related to defined classification criteria for classifying entities;
   training, based on the subset of the attributes selected from the attribute pool, a machine learning decision tree model by continuously selecting statistically significant attributes based on past performance data until quality criteria for the machine learning decision tree model is satisfied;
   receiving data for a first entity, the first entity being an entity requesting transmittal of a first promotion to consumer devices to facilitate rendering of the first promotion via respective electronic interfaces of the consumer devices;
   determining, for the first entity, a first value, the first value for the first entity being a value indicative of a maximum number of first promotions that the first entity is capable of satisfying;
   determining, using the machine learning decision tree model that employs the first value associated with the maximum number of first promotions that the first entity is capable of satisfying, a first prediction value that indicates a programmatically predicted number of consumers that will request termination of an accepted first promotion within a period of time from transmittal of the first promotion to the respective electronic interfaces of the consumer devices;
   determining, based on the first prediction value, a classification for the first entity, the classification specifying a likelihood that the transmittal of the first promotion to one or more consumer devices of the consumer devices will result in a number of terminations less than a pre-specified threshold; and
   in response to determining that the classification satisfies a defined criterion, transmitting an electronic communication associated with the first promotion to the one or more consumer devices, wherein the electronic communication is configured to render the first promotion via one or more electronic interfaces of the one or more consumer devices.

2. The system of claim 1, wherein the machine learning decision tree model is associated with one or more decision trees.

3. The system of claim 1, wherein the machine learning decision tree model is associated with two or more decision trees configured as a random forest.

4. The system of claim 1, wherein determining the first prediction value that indicates the programmatically predicted number of the consumers is further based on historical data associated with the first entity.

5. The system of claim 4, wherein the historical data comprises data associated with services similar to services of the first promotion.

6. The system of claim 1, wherein the determining the first prediction value that indicates the programmatically predicted number of the consumers is further based on location data specifying a distance between a location where the first promotion is available and a nearest city.

7. The system of claim 1, wherein determining the first prediction value that indicates the programmatically predicted number of the consumers is further based on a classification of the first promotion, wherein the classification identifies a group of services to which the first promotion belongs.

8. The system of claim 1, wherein determining the first prediction value that indicates the programmatically predicted number of the consumers is further based on published user reviews associated with the first entity.

9. The system of claim 1, wherein the data processing apparatus is further configured to perform operations comprising determining, for the first entity, a second value, the second value for the first entity being a value indicative of a number of promotions, similar to the first promotion, that are available to consumers at a pre-specified location, the pre-specified location being a location associated with the first promotion.

10. The system of claim 9, wherein determining the first prediction value that indicates the programmatically predicted number of the consumers is further based on the second value.

11. The system of claim 10, wherein the data processing apparatus is further configured to perform operations comprising determining, for the first entity, a third value, the third value for the first entity being a value indicative of a programmatically expected number of consumers that will accept the first promotion within the period of time from the transmittal of the first promotion.

12. The system of claim 11, wherein determining the first prediction value that indicates the programmatically predicted number of the consumers is further based on the third value.

13. A system, comprising:
a data processing apparatus; and
a computer memory apparatus in data communication with the data processing apparatus and storing instructions executable by the data processing apparatus and that upon such execution cause the data processing apparatus to perform operations comprising:
determining attributes for promotions offered via a promotion and marketing service system;
selecting a subset of the attributes from an attribute pool related to defined classification criteria for classifying entities;
training, based on the subset of the attributes selected from the attribute pool, a machine learning decision tree model by continuously selecting statistically significant attributes based on past performance data until quality criteria for the machine learning decision tree model is satisfied;
receiving data for a first entity, the first entity being an entity requesting transmittal of a first promotion to consumer devices to facilitate rendering of the first promotion via respective electronic interfaces of the consumer devices;
determining, for the first entity, a first value, the first value for the first entity being a value indicative of a number of promotions, similar to the first promotion, that are available to consumers at a pre-specified location, the pre-specified location being a location associated with the first promotion;
determining, using the machine learning decision tree model that employs the first value associated with the number of promotions that are available to the consumer at the pre-specified location, a first prediction value that indicates a programmatically predicted number of consumers that will request termination of an accepted first promotion within a period of time from transmittal of the first promotion to the respective electronic interfaces of the consumer devices;
determining, based on the first prediction value, a classification for the first entity, the classification specifying a likelihood that the transmittal of the first promotion to one or more consumer devices of the consumer devices will result in terminations less than a pre-specified threshold; and
in response to determining that the classification satisfies a defined criterion, transmitting an electronic communication associated with the first promotion to the one or more consumer devices, wherein the electronic communication is configured to render the first promotion via one or more electronic interfaces of the one or more consumer devices.

14. A system, comprising:
a data processing apparatus; and
a computer memory apparatus in data communication with the data processing apparatus and storing instructions executable by the data processing apparatus and that upon such execution cause the data processing apparatus to perform operations comprising:
determining attributes for promotions offered via a promotion and marketing service system;
selecting a subset of the attributes from an attribute pool related to defined classification criteria for classifying entities;
training, based on the subset of the attributes selected from the attribute pool, a machine learning decision tree model by continuously selecting statistically significant attributes based on past performance data until quality criteria for the machine learning decision tree model is satisfied;
receiving data for a first entity, the first entity being an entity requesting transmittal of a first promotion to consumer devices to facilitate rendering of the first promotion via respective electronic interfaces of the consumer devices;
determining, for the first entity, a first value, the first value for the first entity being a value indicative of a programmatically expected number of consumers that will accept the first promotion within a pre-specified period of time from transmittal of the first promotion;

determining, using the machine learning decision tree model that employs the first value associated with the programmatically expected number of consumers that will accept the first promotion, a first prediction value that indicates a programmatically predicted number of consumers that will request termination of an accepted first promotion within a period of time from transmittal of the first promotion to the respective electronic interfaces of the consumer devices;

determining, based on the first prediction value, a classification for the first entity, the classification specifying a likelihood that the transmittal of the first promotion to one or more consumer devices of the consumer devices will result in terminations less than a pre-specified threshold; and in response to determining that the classification satisfies a defined criterion, transmitting an electronic communication associated with the first promotion to the one or more consumer devices, wherein the electronic communication is configured to render the first promotion via one or more electronic interfaces of the one or more consumer devices.

\* \* \* \* \*